(12) United States Patent
Lanternier et al.

(10) Patent No.: US 9,937,674 B2
(45) Date of Patent: Apr. 10, 2018

(54) METHOD FOR SHAPING AN OPTICAL COMPONENT IN ORDER TO PRODUCE AN ASPHERICAL SURFACE

(71) Applicant: Commissariat a l'energie atomique et aux energies alternatives, Paris (FR)

(72) Inventors: Thomas Lanternier, Cestas (FR); Stephane Bouillet, Liposthey (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 223 days.

(21) Appl. No.: 14/787,311

(22) PCT Filed: Apr. 29, 2014

(86) PCT No.: PCT/EP2014/058637
§ 371 (c)(1),
(2) Date: Oct. 27, 2015

(87) PCT Pub. No.: WO2014/177525
PCT Pub. Date: Nov. 6, 2014

(65) Prior Publication Data
US 2016/0214338 A1  Jul. 28, 2016

(30) Foreign Application Priority Data

Apr. 29, 2013 (FR) ..................................... 13 53903

(51) Int. Cl.
*B29D 11/00* (2006.01)
*B24B 13/00* (2006.01)
*C03B 23/00* (2006.01)

(52) U.S. Cl.
CPC .......... *B29D 11/00* (2013.01); *B24B 13/0043* (2013.01); *C03B 23/00* (2013.01)

(58) Field of Classification Search
CPC ........ B29D 11/00019; B29D 11/00413; B29D 11/0048–11/00576; B29D 11/00836;
(Continued)

(56) References Cited

U.S. PATENT DOCUMENTS 3,497,577 A * 2/1970 Wichterle ........ B29D 11/00019
264/162
4,188,353 A * 2/1980 Neefe ................. B29C 33/3842
264/2.5
(Continued)

FOREIGN PATENT DOCUMENTS

EP         2 144 093          1/2010

OTHER PUBLICATIONS

Sporer, "TMT-Stressed Mirror Polishing Fixture Study," Proceedings of SPIE, vol. 6267, XP008102616, (2006), pp. 1-13.
(Continued)

*Primary Examiner* — Lisa L Herring
(74) *Attorney, Agent, or Firm* — Oblon, McClelland, Maier & Neustadt, L.L.P.

(57) ABSTRACT

A method for shaping an optical component so that it has an aspherical optical surface. In the method: the optical component is heated and mechanical stresses are applied thereto; heating and applying the mechanical stresses are stopped; an optical surface of the component is polished into a planar or spherical shape; and viscous elastic deformation of the optical component is relaxed. The method for example has applications in manufacturing aspheric mirrors having great dimensions.

7 Claims, 1 Drawing Sheet

(58) Field of Classification Search
CPC ... B29D 11/00855; C03B 25/00–25/12; C03B 32/00–32/005; C03B 23/03–23/0307
See application file for complete search history.

(56) References Cited

U.S. PATENT DOCUMENTS

| | | | |
|---|---|---|---|
| 4,229,390 A * | 10/1980 | Neefe | B29D 11/00019 264/2.2 |
| 2009/0315202 A1 | 12/2009 | De Mollerat Du Jeu et al. | |
| 2014/0160491 A1 | 6/2014 | Bouillet et al. | |
| 2015/0370089 A1 * | 12/2015 | Guilloux | C03B 23/0026 351/159.74 |
| 2016/0039705 A1 * | 2/2016 | Kato | C03B 23/0307 428/174 |

OTHER PUBLICATIONS

Daniel et al., "Tinsley progress on stress mirror polishing (SMP) for the Thirty Meter Telescope (TMT) primary mirror segments II," Proceedings of SPIE, vol. 7733, XP 055095909, (2010), pp. 1-9.
Lubliner et al., "Stressed mirror polishing 1: A technique for producing nonaxisymmetric mirrors," Applied Optics, vol. 19, No. 14, XP055095911, (Jul. 15, 1980), pp. 2332-2340.
International Search Report dated Jun. 3, 2014 in PCT/EP14/058637 Filed Apr. 29, 2014.
French Search Report dated Jan. 14, 2014 in Application No. FR 1353903 Filed Apr. 29, 2013.

* cited by examiner

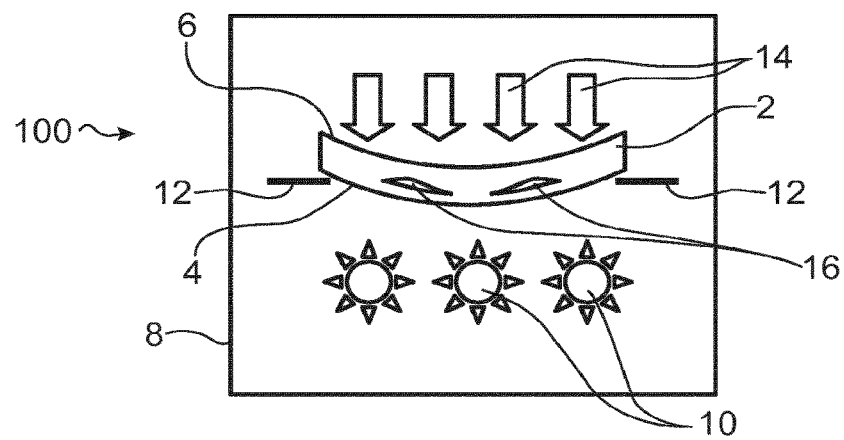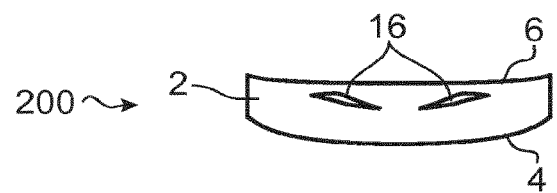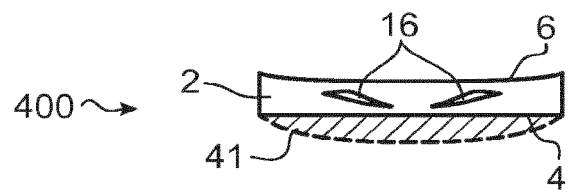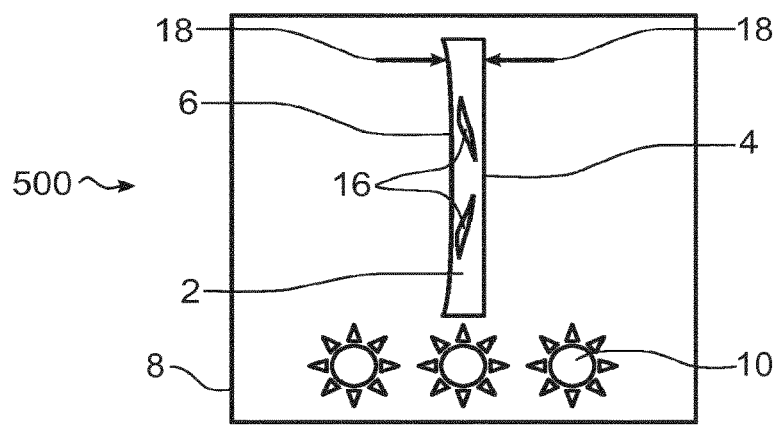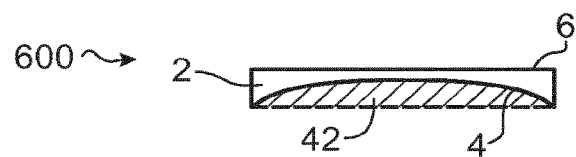

METHOD FOR SHAPING AN OPTICAL COMPONENT IN ORDER TO PRODUCE AN ASPHERICAL SURFACE

TECHNICAL FIELD

The present invention relates to the field of the methods for shaping an optical component so that it has an aspherical optical surface.

STATE OF PRIOR ART

There are known from prior art different techniques for making an aspherical optical component, such an optical component being for instance a revolution one, that is, having an axial symmetry. A free shape can designate a non-revolution aspherical shape.

Aspherical optical components are conventionally produced by moulding (in particular in the case of windshields or some optics of cameras) or by making local alterations on spherical parts.

One drawback of these methods is that they are not suitable for producing optical components having great dimensions. Further, the techniques of local alterations generate defects at spatial frequencies corresponding to the size of the alteration tool. These defects can be restricted by multiplying the local alteration and smoothing (polishing with a large tool) cycles, but the method consequently becomes particularly long.

For producing optical components having large dimensions, it is also known to use a so-called stress polishing technique. One example of this technique is described in the article by J. Daniel et al., « *Tinsley progress on stress mirror polishing (SMP) for the Thirty Meter Telescope (TMT) primary mirror segments II*», Proc. SPIE, vol. 7733, pp. 1-9, 2010. In this article, the authors describe the application of controlled mechanical stresses on a mirror. Said mechanical stresses are maintained while an optical surface of the mirror is polished into a planar or spherical shape. When the mechanical stresses are relieved, the mirror is elastically deformed so that its optical surface takes an aspherical shape. In this technique, the instantaneous elasticity of the material desired to be polished is used.

The relation between mechanical stresses applied to an optical component and a mechanical deformation of said component has been investigated by J. Lubliner et al., in an article entitled "*Stress mirror polishing. 1: A technique for producing nonaxisymmetric mirrors*", Applied Optics, vol. 19, no 14, pp. 2332-2340, 1980.

One drawback of the stress polishing is that it requires an expensive specific support, allowing simultaneously the mechanical stresses to be maintained on the optical component and its surface to be polished.

One object of the present invention is to provide a method for shaping an optical component to produce an aspherical optical surface, which does not have at least one of the drawbacks of prior art.

In particular, one purpose of the present invention is to provide a method for shaping an optical component to produce an aspherical optical surface, which is suitable for optical surfaces having large dimensions.

Another purpose of the present invention is to provide a method of quick shaping enabling an aspherical surface to be produced.

Another purpose of the present invention is to provide an inexpensive shaping method, enabling an aspherical surface to be produced.

DISCLOSURE OF THE INVENTION

The present invention is defined by a method for shaping an optical component having a viscous elasticity property, the method comprising the following steps of:
heating and applying mechanical stresses to the optical component, so as to controllably deform a surface of said optical component called a useful optical surface, the heating bringing the temperature of the optical component from a so-called initial temperature to a so-called working temperature lower than its glass transition temperature;
stopping the heating and relieving the mechanical stresses;
polishing the useful optical surface, to give it a spherical or planar shape, said useful optical surface being intended to form an aspherical optical surface; and
relaxing the viscous elastic deformation of the optical component.

In particular, the method according to the invention comprises the following steps of:
during the application of mechanical stresses, heating the optical component, the heating bringing the temperature of the optical component from a so-called initial temperature to a so-called working temperature lower than its glass transition temperature; and
before polishing, stopping the heating and relieving the mechanical stresses Thus, the optical component is heated during the application of mechanical stresses thereto.

Stopping the heating consists in particular in bringing the optical component back to its initial temperature.

Preferably, the step of relaxing the viscous elasticity of the optical component is implemented by heating the optical component, said optical component being disposed so that its optical axis is orthogonal to the vertical axis.

The step of heating and applying mechanical stresses can be implemented by positioning the optical component in an oven, bearing against at least one bearing support, and by placing masses onto a surface of the optical component on the opposite side of the bearing support.

The optical component is advantageously delimited by two optical surfaces, a ratio between a greatest width of one of the optical surfaces and a greatest distance between both optical surfaces being higher than five.

The optical component can be a glass or ceramics.

Preferably, the optical component is a borosilicate type glass.

BRIEF DESCRIPTION OF THE DRAWINGS

The present invention will be better understood upon reading the description of an exemplary embodiment given by way of purely indicating and in no way limiting purposes, with reference to FIG. 1.

DETAILED DISCLOSURE OF PARTICULAR EMBODIMENTS

An exemplary implementation of the method according to the invention will now be schematically described with reference to FIG. 1.

The method comprises a first step 100, of heating and applying mechanical stresses to an optical component 2.

The mechanical stresses 14 are controllably applied. Thus, a predetermined mechanical deformation of the component 2 is achieved. The relation between the mechanical stresses applied to a component at a given temperature, and its deformation, can be determined using a finite element analysis software. An analytical calculation method as described in the article by J. Lubliner et al. mentioned in the introductive part could also be conducted.

The mechanical stresses 14 can be applied by placing the component 2 in a horizontal position on supports 12 forming bearing points, and by placing masses on the component 2 at predetermined locations. Placing the component 2 into a horizontal position amounts to aligning its optical axis with the vertical axis. Any other method for applying mechanical stresses could also be implemented, in particular by applying radial forces onto the edges of the optical component, these edges surrounding an optical surface desired to be shaped so that it is aspherical.

Heating consists in bringing the optical component 2 from a so-called initial temperature to a so-called working temperature. The working temperature is higher than the initial temperature. Typically, it will be considered that the working temperature should remain lower than the glass transition temperature of the component 2. In the case of a glass component, the glass transition temperature of the optical component substantially corresponds to the middle of the temperature range in which said component gradually becomes more viscous and switches from a solid state to a liquid state. In practice, the component 2 is brought into an oven 8, in proximity to heat sources 10. The initial temperature corresponds to the room temperature, in the order of 20° C. The working temperature can be in the order of several hundred Celsius degrees, for example between 200° C. and 500° C. Heating the component 2 can be referred to as "annealing".

The combination of heating and simultaneous application of mechanical stresses enables the component 2 to be more easily deformed and with a greater amplitude.

The method according to the invention then comprises a second step, 200, of stopping the heating and relieving the mechanical stresses.

Stopping the heating consists in bringing the component 2 back to its initial temperature. In practice, the component 2 is extracted off the oven 8.

The component 2 is such that, when subjected to a mechanical stress, it is deformed.

When the mechanical stress is relieved, most of the deformation immediately disappears. This is called an instantaneous elasticity relaxation of the optical component 2.

The rest of the deformation does not immediately disappear.

In practice, it is noticed that the optical component 2 does not recover immediately its initial shape but keeps a fraction of the deformation imposed thereto for some time by the stresses applied thereto.

This residual fraction of deformation is due to inner stresses 16 which continue to exist in the component 2 even after relieving the mechanical stresses, said mechanical stresses forming outer stresses.

After some time, the inner stresses 16 disappear. The phenomenon is thus actually "elastic", but with some delay. The component 2 is said to have a viscous elasticity property. A memory effect can also be referred to. The component will then go back to its initial shape, unless of course it has been machined in the meantime. This can be referred to as relieving or, equivalently, relaxation of the viscous elastic deformation of the component 2. This relaxation of the viscous elastic deformation of the component 2 is characterized by a time constant.

The heating, at the same time as the application of mechanical stresses, enables this time constant to be increased. By varying the heating temperature, as well as the duration of heating and of the application of the mechanical stresses, the value of this time constant can thus be adjusted, and thus the duration during which the component still has a residual fraction of the initially applied deformation.

A viscous elasticity has for example be obtained with a time constant of about one year, for a component 2 of borosilicate type glass (BK7 glass in particular) heated in an oven at 200° C. for two hours. An increase in the heating duration and temperature enables this time constant to be increased.

It has been shown that the deformation fraction remaining after stopping heating and relieving the mechanical stresses corresponds to a fixed fraction of the deformation applied to the component in step 100, for a given material having been heated at a given temperature during this same step. This fraction depends on the temperature in question and on the type of material but does not depend on the thickness of the component 2, neither on the dimensions of its optical surfaces, nor on the deformation applied. For example, it has been shown that this fraction is equal to 5.3%, for BK7 glass heated at 200° C.

Thus, are known:
the relation between the mechanical stresses applied and the deformation of the component 2, and
the relation between the deformation of the component 2 and the fraction of deformation remaining after stopping heating and relieving the mechanical stresses.

The relation between the mechanical stresses applied to the component 2 and the fraction of deformation remaining after stopping heating and relieving the mechanical stresses can thus be retrieved. Finally, an optical component 2 having an aspherical surface 4, defined by a certain deviation relative to a planar or spherical shape is obtained.

It is reminded that numerous glasses, such as borosilicate type glasses, as well as numerous ceramics, have a viscous elasticity. The optical component 2 is for example of glass such as N-BK7 Schott glass, or of ceramics.

At the end of step 200 of stopping heating and relieving the mechanical stresses, the optical surface 4 of the component 2 has a certain deviation relative to a planar or spherical shape called a reference shape. In the following, this deviation will be referred to as a positive deviation 41. This deviation can be defined as being, for each point of the reference shape, the distance between this point and the orthogonal projection of this point on the optical surface 4.

For the sake of clarity of FIG. 1, the deformation of the surface 4 at the end of step 200 has been magnified in FIG. 1.

The method according to the invention then comprises a step 400 of polishing the optical surface 4, into said reference (planar or spherical) shape. The optical surface 4 is the surface intended to form an aspherical optical surface. A useful optical surface can designate the optical surface 4. In FIG. 1, the reference shape is planar.

The method according to the invention then comprises a step 500 of relaxing the viscous elasticity of the optical component 2.

This step 500 is for example implemented using a vertical heating of the optical component 2. This can be referred to as a second annealing. The optical component 2 is for example placed again in the oven 8. The optical component 2 is placed "in the vertical position", that is aligned so that its optical axis is orthogonal to the vertical axis. The vertical axis is defined as the axis parallel to the direction of gravity. The optical axis of the optical component is for example its axis of symmetry, if the optical surfaces have an axial symmetry. In order to maintain the optical component 2 aligned along the vertical axis, posts 18 disposed on either side of the optical component 2 can for example be used. In the case of a cylindrical shaped component 2, a barrel can also be used. And, if the component 2 is prismatic, in particular parallelepiped, it can even be simply put on the slice in some cases. Typically, the duration and the temperature of this vertical heating are equal to the duration and the temperature of the heating implemented in step 100.

The step 500 of relaxing the viscous elasticity again deforms the optical surface 4.

At the end of this step, the optical surface 4 thus has a deviation 42 relative to said reference (planar or spherical) shape, this deviation being the reverse of the previously obtained positive deviation 41. This new deviation is referred to as a negative deviation. In other words, the sum of the positive deviation 41 and the negative deviation 42 is zero.

The desired shape deviation with respect to a planar or spherical reference shape is thus achieved by generating the reverse of the desired deviation. This can also be called the negative of the desired deviation. The purpose is thus to generate bumps where it is desired to have valleys and reversely.

In FIG. 1 is also represented a step 600 of extracting the optical component 2 off the oven, after relaxing its viscous elasticity.

It is not necessary for the viscous elasticity deformation to have a particularly long time constant. It is simply sufficient that this time constant is high enough with respect to the polishing duration 400 of the optical surface 4.

According to an advantageous alternative, said time constant is short, for example in the order of a few weeks. The step 500 of relaxing the viscous elasticity of the optical component 2 can then require no particular handling, since waiting a certain period is enough for this viscous elasticity to be "naturally" relaxed, that is without a second heating being required to speed up this process.

The (planar or spherical) shape, into which the optical surface 4 is polished, is chosen so as to minimize a deviation with the shape of the desired aspherical optical surface in the end.

Thus, it can be seen that the present invention judiciously exploits the viscous elasticity properties of the optical component 2, whereas this phenomenon was to date considered as annoying, in particular during a stress polishing. Whereas those skilled in the art were incited to minimize this viscous elasticity effect, the present invention intends conversely to take advantage of this effect by heating the component 2 during the application of the mechanical stresses.

The method according to the invention is suitable for shaping any type of optical surfaces, even optical surfaces having large dimensions.

The method according to the invention makes it possible to get rid of the drawbacks associated with the local alterations.

Polishing is not simultaneously implemented with the application of the mechanical stresses. Thus, requirements relative to the equipment to be used to implement the method are lesser. Standard polishing means can be used. The method according to the invention is therefore inexpensive to implement.

After relaxing the viscous elastic deformation of the optical component, a finishing step using a local polishing tool can be implemented. However, even by considering such a finishing step, the invention enables a number of polishing cycles to be dramatically reduced as compared with methods according to prior art multiplying local alteration and smoothing cycles. The method according to the invention is therefore a quick shaping method enabling an aspherical surface to be produced.

A particularly advantageous application of the invention relates to shaping thin optical components. An optical component delimited by two optical surfaces is considered as thin when a ratio between a greatest width of one of the optical surfaces and a greatest distance between both optical surfaces is higher than five. The width of an optical surface corresponds to its diameter, in the case of a circular shaped surface. A distance between both optical surfaces can be measured along an axis parallel to the optical axis of the optical component. A width of an optical surface can be measured in a plane orthogonal to the optical axis of the optical component.

The present invention has in particular an application in making aspherical mirrors having large dimensions, intended to research in astrophysics or focusing power lasers, in making cylindrical mirrors, intended to reflect a synchrotron radiation, or also in making solar concentrators.

It can also be implemented to compensate for defects of a component resulting, in the absence of compensation, in optical aberrations such as astigmatism, trefoil and coma. The optical component 2 can also be shaped so that it compensates for aberrations of an optical system upstream or downstream of an optical chain.

The invention is not restricted to the examples described, and numerous alternatives, for example other materials for the optical component, other heating durations and temperatures, other means for applying mechanical stresses during heating, etc. can be implemented, without departing from the scope of the present invention.

The invention claimed is:

1. A method for shaping an optical component having a viscous elasticity property, comprising:
   heating and applying mechanical stresses to the optical component, to controllably deform a surface of the optical component as a deformed optical surface, the heating bringing a temperature of the optical component from an initial temperature to a working temperature lower than its glass transition temperature;
   stopping the heating and relieving the mechanical stresses, whereby the deformation of the deformed optical surface partially disappears, corresponding to an instantaneous elasticity relaxation of the optical component;
   polishing the deformed optical surface, to give it a spherical or planar shape, whereby the deformed optical surface is configured to form an aspherical optical surface; and
   relaxing viscous elastic deformation of the optical component, corresponding to a residual fraction of the deformation of the deformed optical surface.

2. The method according to claim 1, wherein the relaxing the viscous elastic deformation of the optical component is implemented by heating the optical component, the optical component being disposed so that its optical axis is orthogonal to the vertical axis.

3. The method according to claim 1, wherein the heating and applying mechanical stresses is implemented by positioning the optical component in an oven, bearing against at least one bearing support, and placing masses onto a surface of the optical component on an opposite side to the at least one bearing support.

4. The method according to claim 1, wherein the optical component is delimited by two optical surfaces, a ratio between a greatest width of one of the optical surfaces and a greatest distance between both optical surfaces being higher than five.

5. The method according to claim 1, wherein the optical component is a glass or ceramics.

6. The method according to claim 5, wherein the optical component is a borosilicate type glass.

7. The method according to claim 1, wherein the stopping the heating includes extracting the optical component out of an oven.

* * * * *